(12) United States Patent
Nolting et al.

(10) Patent No.: US 7,260,192 B2
(45) Date of Patent: *Aug. 21, 2007

(54) INTERNET USER FINDER

(75) Inventors: Thomas A. Nolting, Holliston, MA (US); Karen Dion, Dudley, MA (US); Richard LaPearl, Princeton, MA (US)

(73) Assignee: Verizon Services Corp., Arlington, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/188,714

(22) Filed: Nov. 10, 1998

(65) Prior Publication Data

US 2001/0012345 A1 Aug. 9, 2001

Related U.S. Application Data

(63) Continuation-in-part of application No. 09/048,102, filed on Mar. 26, 1998.

(51) Int. Cl.
*H04M 15/00* (2006.01)
*H04M 1/24* (2006.01)

(52) U.S. Cl. .......................... 379/114.01; 379/112.01; 379/112.07; 379/32.01; 379/133; 379/134

(58) Field of Classification Search ............... 379/111, 379/112, 113, 114, 133, 134, 32.01, 32.02, 379/32.04, 32.05, 112.01, 112.03, 112.05, 379/112.06, 112.07, 114.01, 114.03; 370/229, 370/230, 233
See application file for complete search history.

(56) References Cited

U.S. PATENT DOCUMENTS 4,197,427 A * 4/1980 Hutcheson et al. ......... 379/133
4,456,788 A 6/1984 Kline et al.
4,760,594 A 7/1988 Reed (Continued)

OTHER PUBLICATIONS

Hewlett Packard 1991 "Test & Measurement Catalog", entitled "Data Communications Test Equipment", p. 567.
Hewlett Packard Brochure entitled "Unlock the secrets of Signaling System No. 7—fast", HP 37900B and 37900C Signaling Test Sets.
Hewlett Packard Brochure entitled "GSM Signaling Test System", HP 37900 Product Note–1.
"Can you afford to be without SS7 network surveillance?" by Rex R. Hester, Telephony, Dec. 3, 1990.

(Continued)

*Primary Examiner*—Curtis Kuntz
*Assistant Examiner*—Quoc Tran

(57) ABSTRACT

Specialized telecom network users who burden the network, such as high-volume users of Internet services, are identified by analysis of network traffic data to identify addresses (e.g. telephone numbers) for callers to destinations associated with the particular call-in service. Destination telephone numbers may be identified from a list of known service providers or from a network traffic study, which identifies destination numbers receiving unique patterns of incoming traffic. Analysis of the records of calls to the destination numbers then identifies numbers for callers who made more than some minimum number of calls during the study or who accumulate more than some threshold amount of total connect time on such calls. The preferred embodiments utilize automated systems to compile and analyze call records from standard messages of a telephone network, such as interoffice signaling messages or automated accounting messages. Data from the records can be translated to identify the calling subscribers, e.g. by name and address or by point of connection to the network.

31 Claims, 6 Drawing Sheets

U.S. PATENT DOCUMENTS

| | | | |
|---|---|---|---|
| 4,788,718 A * | 11/1988 | McNabb et al. | 379/113 |
| 5,008,929 A | 4/1991 | Olsen et al. | |
| 5,333,183 A * | 7/1994 | Herbert | 379/112 |
| 5,359,649 A | 10/1994 | Rosu et al. | |
| 5,425,087 A | 6/1995 | Gerber et al. | |
| 5,457,729 A | 10/1995 | Hamann et al. | |
| 5,475,732 A | 12/1995 | Pester, III | |
| 5,483,590 A * | 1/1996 | Chiu et al. | 379/269 |
| 5,509,055 A * | 4/1996 | Ehrlich et al. | 379/133 |
| 5,563,930 A | 10/1996 | Pester, III | |
| 5,579,371 A | 11/1996 | Aridas et al. | |
| 5,592,530 A | 1/1997 | Brockman et al. | |
| 5,712,908 A | 1/1998 | Brinkman et al. | |
| 5,715,294 A | 2/1998 | Pester, III | |
| 5,737,399 A | 4/1998 | Witzman et al. | |
| 5,754,634 A | 5/1998 | Kay et al. | 379/134 |
| 5,757,895 A | 5/1998 | Aridas et al. | |
| 5,768,352 A * | 6/1998 | Elliott et al. | 379/112 |
| 5,774,530 A | 6/1998 | Montgomery et al. | |
| 5,793,839 A | 8/1998 | Farris et al. | |
| 5,802,145 A | 9/1998 | Farris et al. | |
| 5,809,120 A | 9/1998 | Montgomery et al. | |
| 5,825,769 A | 10/1998 | O'Reilly et al. | |
| 5,828,729 A * | 10/1998 | Clermont et al. | 379/133 |
| 5,838,682 A | 11/1998 | Dekelbaum et al. | |
| 5,838,769 A | 11/1998 | McNeil et al. | |
| 5,844,981 A | 12/1998 | Pitchford et al. | |
| 5,850,426 A | 12/1998 | Watkins et al. | |
| 5,854,835 A | 12/1998 | Montgomery et al. | |
| 5,867,565 A | 2/1999 | Morikawa | |
| 5,881,140 A | 3/1999 | Gerault et al. | |
| 5,896,445 A * | 4/1999 | Kay et al. | 379/113 |
| 5,901,208 A | 5/1999 | Jabbarnezhad | |
| 5,903,635 A * | 5/1999 | Kaplan | 379/133 |
| 5,905,785 A * | 5/1999 | Dunn et al. | 379/113 |
| 5,905,985 A | 5/1999 | Malloy et al. | |
| 5,907,603 A | 5/1999 | Gallagher et al. | |
| 5,933,490 A | 8/1999 | White et al. | |
| 5,940,471 A | 8/1999 | Homayoun | |
| 5,970,476 A * | 10/1999 | Fahey | 705/28 |
| 5,970,477 A * | 10/1999 | Roden | 379/112 |
| 5,999,604 A * | 12/1999 | Walter | 379/112 |
| 6,011,838 A * | 1/2000 | Cox | 379/113 |
| 6,078,647 A * | 6/2000 | D'Eletto | 379/34 |
| 6,351,453 B1 * | 2/2002 | Nolting et al. | 379/133 |
| 6,385,301 B1 * | 5/2002 | Nolting et al. | 379/32.01 |
| 6,441,681 B1 * | 6/2002 | Nolting et al. | 379/34 |

OTHER PUBLICATIONS

"Telecommunications", International Edition, vol. 23, No. 8, Aug. 1989.

Article entitled "Test and Measurement Techniques for GSM", from Telecommunications, Dec. 1989 issue.

Hewlett Packard Brochure entitled "HP 37900A and 37900B Signaling Test Sets", Technical Data for "Get the best from Signaling System No. 7".

Hewlett Packard Brochure entitled "Wide area networking protocol analysis solutions for the long run." re HP 4954A wide area network protocol analyzer, 1987.

Article entitled "ASQIC 800 CALL DATA MASTER", published in AT&T Technical Journal, pp. 21–31, May/Jun. 1987, vol. 66, Issue 3.

Article entitled "By probing your SS7 links, you can gather all sorts of information", published in Wireless Review, May 1, 1998.

Press Release entitled "Inet Technologies Reports Record Revenues for Eleventh Consecutive Quarter" dated Jan. 25, 2001.

"Investor Relations FAQs" published by Inet Technologies, Inc., Sep. 7, 2000.

Promotional materials entitled "Network Operations & Maintenance", "IT: seven Revenue Assurance Applications", "Diagnostics", and "IP/SS7 Interoperability" by Inet Technologies, Inc.

Promotional Brochure entitled "GeoProbe Mobile", published by Inet Technologies, Inc.

Promotional materials published by Inet Technologies, Inc. including GeoProbe Service Provider's Competitive Advantage, GeoCare, and 2 press releases.

Inet Technologies Inc. (INTI) Quarterly Report (SEC from 10–Q), dated Aug. 4, 2000.

New Release entitled AT&T to manage international gateway sites with Inet's GeoProbe system:, dated Jan. 26, 1998.

"Gentia Software, Section 3: Query and Reporting Tools", by META Group, Inc., *Data Warehousing Tools Bulletin* (Aug. 1997); pp, 3615–3620.

* cited by examiner

INTERNET USER FINDER

CROSS-REFERENCE TO RELATED APPLICATIONS

This application is a continuation-in-part of U.S. patent application Ser. No. 09/048,102 filed on Mar. 26, 1998 entitled NETWORK PLANNING TRAFFIC MEASUREMENT PROGRAM, the disclosure of which is entirely incorporated herein by reference.

TECHNICAL FIELD

The present invention relates to a method and system for analyzing call specific data records for traffic through a telecommunication network in order to identify high volume users who call specific types of service providers, particularly high volume Internet users.

ACRONYMS

The written description uses a large number of acronyms to refer to various services, messages and system components. Although generally known, use of several of these acronyms is not strictly standardized in the art. For purposes of this discussion, acronyms therefore will be defined as follows:

Address Complete Message (ACM)
Asynchronous Digital Subscriber Line (ADSL)
ANswer Message (ANM)
Application Service Part (ASP)
Automatic Message Accounting (AMA)
BellCore AMA Format (BAF)
Carrier Access Billing System (CABS)
Call Detail Record (CDR)
Centi-Call Second (CCS)
Central Office (CO)
Competitive Local Exchange Carrier (CLEC)
Common Channel Interoffice Signaling (CCIS)
Common Language Location Identifier (CLLI)
Customer Record Information System (CRIS)
Destination Point Code (DPC)
End Office (EO)
Global Title Translation (GTT)
Graphical User Interface (GUI)
Initial Address Message (IAM)
Integrated Service Control Point (ISCP)
Integrated Services Digital Network (ISDN)
ISDN User Part (ISDN-UP or ISUP)
Inter-exchange Carrier (IXC)
Internet Service Provider (ISP)
Landing Zone (LZ)
Line Identification Data Base (LIDB)
Local Area Network (LAN)
Local Exchange Carrier (LEC)
Loop Maintenance Operations Systems (LMOS)
Message Processing Server (MPS)
Message Signaling Unit (MSU)
Message Transfer Part (MTP)
Multi-Dimensional DataBase (MDDB)
Numbering Plan Area (NPA)
Office Equipment (OE)
Online Analytical Processing (OLAP)
Origination Point Code (OPC)
Operations, Maintenance Application Part (OMAP)
Percentage Internet Usage (PIU)
Personal Computer (PC)
Public Switching Telephone Network (PSTN)
Release Complete Message (RLC)
Release Message (REL)
Revenue Accounting Office (RAO)
Service Control Point (SCP)
Service Switching Point (SSP)
Signaling System 7 (SS7)
Signaling Point (SP)
Signaling Transfer Point (STP)
Structured Query Language (SQL)
Transaction Capabilities Applications Part (TCAP)
Wide Area Network (WAN)

BACKGROUND ART

Rapid changes and increases in demand for telecommunication services increase the pressures for cost effective engineering and upgrading of the telephone network. The demand for traditional telephone service continues to increase, but at a steady and readily predictable pace. Several newer types of traffic through the telephone network, however, are increasing at an exponential rate and impose new traffic patterns that exacerbate difficulties in meeting the new traffic demands. The most significant and burdensome of these new types of traffic relates to calls through the telephone network to access data services, particularly the Internet.

The most common form of Internet access relies on modems and analog telephone network connections. A modem of this type modulates data from a personal computer (PC) for transmission in the voice telephone band over a telephone connection to the Internet service provider (ISP) and demodulates data signals received from the ISP over such a link. The analog telephone modem operates at one subscriber premises end of a voice grade line to transmit and receive signals over the line and through the telephone switch network to and from another similar line and modem in communication with an ISP's host equipment.

To access the Internet, the user activates her PC and modem to dial a number for the ISP. The telephone network switches the call through to a line going to a modem pool operated by the ISP. Once connected through the telephone network, the user logs on, and the ISP's equipment provides communications over the worldwide packet switched network now commonly known as the Internet. This telephone-based operation provides the voice grade analog modem a unique power, the necessary connections for Internet access are virtually ubiquitous. Users can call in from virtually any telephone line or wireless telephone (e.g. cellular) almost anywhere in the world.

However, the calling patterns for this type of data communications, particularly Internet access, are radically different from those of normal voice traffic. The sudden increase in popularity of access to the Internet and the difference in call-in traffic patterns have radically changed the loading placed on the telephone network.

Normal voice telephone calls tend to occur at random times, and the network typically routes the majority of such calls to random destinations. Also, the average hold times for such calls tend to be short, e.g. three minutes or less. By contrast, Internet traffic tends to have severe peak traffic times during any given twenty-four hour period, e.g. from 8:00PM to 11:00PM. Also, the network must route Internet access calls to a very small number of destinations, i.e. to the lines for modem pools operated by Internet Service Providers (ISPs). Instead of many parties calling each other randomly, many callers are all calling in to a limited number of service providers. Finally, hold times for Internet calls can last for hours. Some Internet users access the Internet when they sit down at their desks and leave the call connections up until they decide to turn their computers off, e.g. at the end of their day. If they leave their computers on all the time, the connections to the ISPs may stay up for days. These Internet traffic patterns add incredibly heavy traffic loads to the telephone network and tend to concentrate those loads in specific offices providing service to the ISPs.

The local exchange carriers (LECs) are considering a number of different options for relieving the congestion caused by Internet access traffic. Using existing technologies, these options include deploying more switches and trunk circuits and designing the connections of switches and trunks to the ISPs and their high-end users to minimize call switching and/or trunk congestion. For example, if there is a heavy concentration of ISP bound calls from a mid-town end office switch to an end office in the suburbs that serves the ISP, the LEC might install additional direct trunks between those offices to reduce the need for overflow routing through a tandem office. Within the mid-town office switch, the LEC might connect the high-end users that call the particular ISP to the same switch module that connects to the new direct trunks to the suburban end office, in order to reduce the inter-module switching load within the mid-town switch. Similarly, in the suburban office, the LEC would connect the new trunks to the same switch module that serves the ISP.

The carriers also are considering and experimenting with a number of options to off-load the Internet access traffic from the voice telephone network. Such options range from deployment of dedicated trunks to the modem pools of the ISPs to deployment of advanced digital loop carrier systems that can recognize data calls and switch such calls over to some link directly to a fast packet network. Other technologies, such as Asynchronous Digital Subscriber Line (ADSL) networks, provide a totally separate logical path for the data communications.

The various strategies intended to address the increasing traffic demands of Internet access, such as adding end offices, deploying specialized switching modules, installing ADSL networks, adding trunks, deploying more tandem offices and the like, all require considerable expense by the carriers. Accurate engineering, to minimize cost and yet reduce congestion and provide effective service to the various customers, becomes ever more essential. To provide effective engineering, it is necessary that the carrier understand the traffic involved. Such understanding requires accurate and complete traffic measurement. Accurate information also is necessary to resolve disputes, for example with the ISPs over service quality.

Understanding the loading caused by access calls to ISPs requires identifying the high-volume users of data services. Identifying such users would allow network engineers to design off-load strategies to reduce congestion. Such knowledge also would enable the carrier to focus efforts to market advanced data services, such as Asynchronous Digital Subscriber Line (ADSL), to customers having an existing need for data services. These often are the customers most troubled by network congestion and low-bandwidth. As discussed more later, current technology does not readily enable identification of heavy callers to data services or the like.

A need therefore exists for an effective technique to measure and analyze unique traffic patterns, particularly as they relate to Internet access calls. A more specific need is for a technique to measure traffic, identify characteristic traffic patterns and determine therefrom the heavy users making calls to the data access points, e.g. the heavy callers to the ISPs.

A number of techniques have been developed for monitoring operations of the public switching telephone network. While these prior techniques may be effective for some purposes, they have not proven effective for analyzing Internet access traffic or recognizing heavy users of data services. To complete the understanding of the background of the invention, it may be helpful to briefly consider some of the prior techniques for network monitoring.

U.S. Pat. No. 5,475,732 Pester describes an SS7 Network Preventative Maintenance System for detecting potential SS7 and switched network troubles, automatically analyzing the troubles, and providing alarm and corrective action to avoid major network events. The Pester SS7 Real Time Monitor System described in that Patent is a multi-stage SS7 network preventative maintenance tool that traps SS7 messages, detects potential SS7 and switched network troubles, automatically analyzes those troubles, and provides alarm and corrective action instructions to maintenance personnel U.S. Pat. No. 5,592,530 to Brockman et al. relates to an SS7 monitoring system for evaluating the operations of telephone switches by capturing data between signaling nodes of a telephone switching system. The Brockman et al. surveillance equipment captures signaling information from different signaling network paths within a mated STP pair and correlates the fragmented messages for each monitored call. The system is capable of generating call detail records from the SS7 messages of a mated pair cluster, for use in billing and fraud detection.

While the above discussed Pester and Brockman et al. Patents describe the usefulness of monitoring an SS7 common channel interoffice signaling network for event detection, neither of these patents is directed to the particular problems of traffic measurement addressed by the present invention. The Pester Patent places emphasis on monitoring of the SS7 network itself in order to detect troubles in its functioning. The Brockman et al. Patent focuses on monitoring of all links to the STPs in a pair and the assembly of related SS7 signaling messages to form a record of call completions.

While these methodologies may be effective for their stated purposes there remains a distinct need for an efficient and effective tool for monitoring and analyzing types of traffic through the telephone network, to recognize unique patterns and identify key users involved in such traffic patterns. Attempts to use other more traditional approaches, such as the accumulation of data from the switches themselves and the Engineering and Administrative Data Acquisition System fell short of providing the desired information.

For example, today, a LEC conducts studies on usage in an office by setting up a "busy study" with respect to specific individual lines served through that office. It is not possible to look at all the traffic in the office at one time. Typically, the LEC can study maybe three different lines at a time. So in a 50,000-line office the LEC engineers can examine the traffic for up to three hundred lines at any one time. Also, setting up and maintaining such studies are labor intensive. To conduct a meaningful number of studies throughout a large service area, a LEC virtually needs an army of clerical people whose main job function is setting up busy studies. Once set up, such a study may run for three weeks, but at the end of that time, it takes another two weeks to process the output and organize the results into a report. Results are not available in real-time. Even when results do become available, the study only shows data on a few lines that may or may not be causing blockage in the busy hour. If the lines were not properly selected, the busy study may be virtually meaningless to the network engineer trying to relieve congestion through the office. Traffic patterns are changing rapidly, e.g. as new ISPs obtain lines or existing ISPs add new lines in already congested service areas. As a result, by the time that the engineer accumulates enough data for a meaningful study, the data may already be obsolete. Finally, the known network study techniques provide little or no help identifying the high volume users; i.e. the users who call often and exhibit long hold times on the calls to the service provider.

It is accordingly an object of this invention to provide a relatively low cost solution to those problems.

It is another object of the invention to provide a timely, powerful, cost effective means of analyzing traffic on the Public Switching Telephone Network (PSTN) to identify the calling parties involved in unique and troublesome traffic patterns.

It is a further object of the invention to provide a flexible, expedient, accurate, and cost effective method to identify individual calling parties (numbers and/or lines) contributing to network blockage. Specifically, it is an object of the invention to provide such a technique to identify numbers or lines associated with high volume Internet users.

It is yet another object of the invention to implement Internet related traffic studies and enable better service to Internet users while maintaining optimal network utilization.

DISCLOSURE OF THE INVENTION

The invention addresses the above stated needs by providing effective techniques for tracking traffic through a telecommunication network in such a manner as to identify a certain class of users. Specifically, the invention contemplates identifying high-volume users calling-in to destination numbers associated with a particular type of service, such as an Internet access service.

Detailed records of calls are developed from monitoring or compiling of items of information from certain management data messages used by the network. Management data here refers to information generated by the telecommunication network for its operations purposes, for example, interoffice signaling messages generated to control call set-up and tear-down. Another example of such data would be messages sent from central offices of the network to an accounting office, for record keeping and billing purposes.

In one aspect, the present invention relates to a method for identifying callers. The method involves identifying destination telephone numbers of a type of customer subject to a target type of call-in service, for example numbers of Internet service providers (ISPs). Data records of calls through a portion of a telecommunication network to the identified destination telephone numbers are compiled. The method involves analysis of these data records, to identify callers having a high volume of usage associated with calls to the identified destination telephone numbers.

The identification of the destination numbers may involve selection of numbers from an inventory listing the numbers of known providers of the target service. Preferably this identification uses a traffic tracking study to identify destination numbers matching a pattern of incoming call traffic for the target service. For Internet services, the study would identify destination numbers with a large volume of incoming calls and a long average hold time.

The analysis of the records may identify callers having usage on calls to the identified destination telephone numbers exceeding a threshold, for example expressed in terms of total connect time. Alternatively, the measure of usage may comprise the number of calls to the identified destination numbers within a predetermined period of time.

Having identified numbers for particular heavy network users, such as heavy users of Internet services, it is possible to enhance the results of the analysis. For example, reference data may be used to translate an item of information from a data record of a call into descriptive information. The descriptive information may identify an office of the network assigned to provide switching services relating to the number. As another example, the descriptive information may identify a subscriber, for example by name and address or by the point of subscriber connection to the network. These identifications facilitate marketing advanced services to the identified subscribers, and/or engineering of solutions to network congestion.

Another aspect of the invention relates to a system, for use with a telephone network, for identifying originating telephone numbers as candidate numbers believed to be associated with users of a particular type of service. The system includes means in communication with elements of the network for compiling detailed records for calls processed through a portion of the telephone network. A server system, in communication with the means for compiling, receives and analyzes the detailed records to identify each calling party telephone number satisfying predetermined criteria as a candidate telephone number. The predetermined criteria includes at least one call to a destination number associated with the particular type of service during a predetermined study interval, and usage associated with the one call(s) that meets or exceeds a threshold value.

The preferred embodiments of the present invention utilize real time monitors on selected SS7 links to collect interoffice signaling messages. A site processor compiles data from the signaling messages relating to individual calls, to form call detail records (CDRs) for all interoffice call attempts. The site processor uploads the CDRs to a relational database. Automatic Message Accounting (AMA) records also are accumulated for at least selected central office switching systems and uploaded to a relational database.

Data from the relational databases is processed or 'prepared' and uploaded to a multi-dimensional database. The data preparation includes supplementing the records with reference data and where necessary spreading or "binning" usage data to multiple tracking intervals. The multi-dimensional database provides on-line analytical processing tools for enhanced processing of the call data and offers an efficient graphical user interface, preferably a web suite type interface. Applications running in the multi-dimensional database enable analysis and presentation of study results to identify particular traffic patterns and end users. The applications, for example, include an ISP finder application and a heavy Internet user finder application. Other applications may utilize the results of these finder studies.

The preferred embodiment of the on-line analytical processing routine comprises a multi-dimensional database with a presentation layer. The presentation layer may be an independent program or an integral element incorporated in a software package with the multi-dimensional database. The presentation layer provides the user interface, for example in the form of a client-server interface or a web-browser interface. The presentation layer offers the user fast and flexible access to the study data.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

DETAILED DESCRIPTION OF THE PREFERRED EMBODIMENTS

The present invention involves compiling call records from management data of a telecommunication network. From those records, the invention identifies users who initiate a high volume of traffic to a particular type of service provider, for example to a provider of Internet access services. Essentially, such a user finder study involves identifying destination numbers of the service providers. The records of calls to those destination numbers are analyzed to identify callers meeting predetermined criteria, e.g. making more than a threshold number of calls or compiling more than a minimum amount of total connect time to the service providers.

This inventive technique may identify heavy usage callers to a variety of different types of service providers, for example, to providers of dial-up long distance services, to pre-paid calling card services, etc. In the presently preferred embodiment, the inventive study identifies heavy users of Internet services, and the following discussion will concentrate on the heavy Internet user finder methodology.

Figure 1:
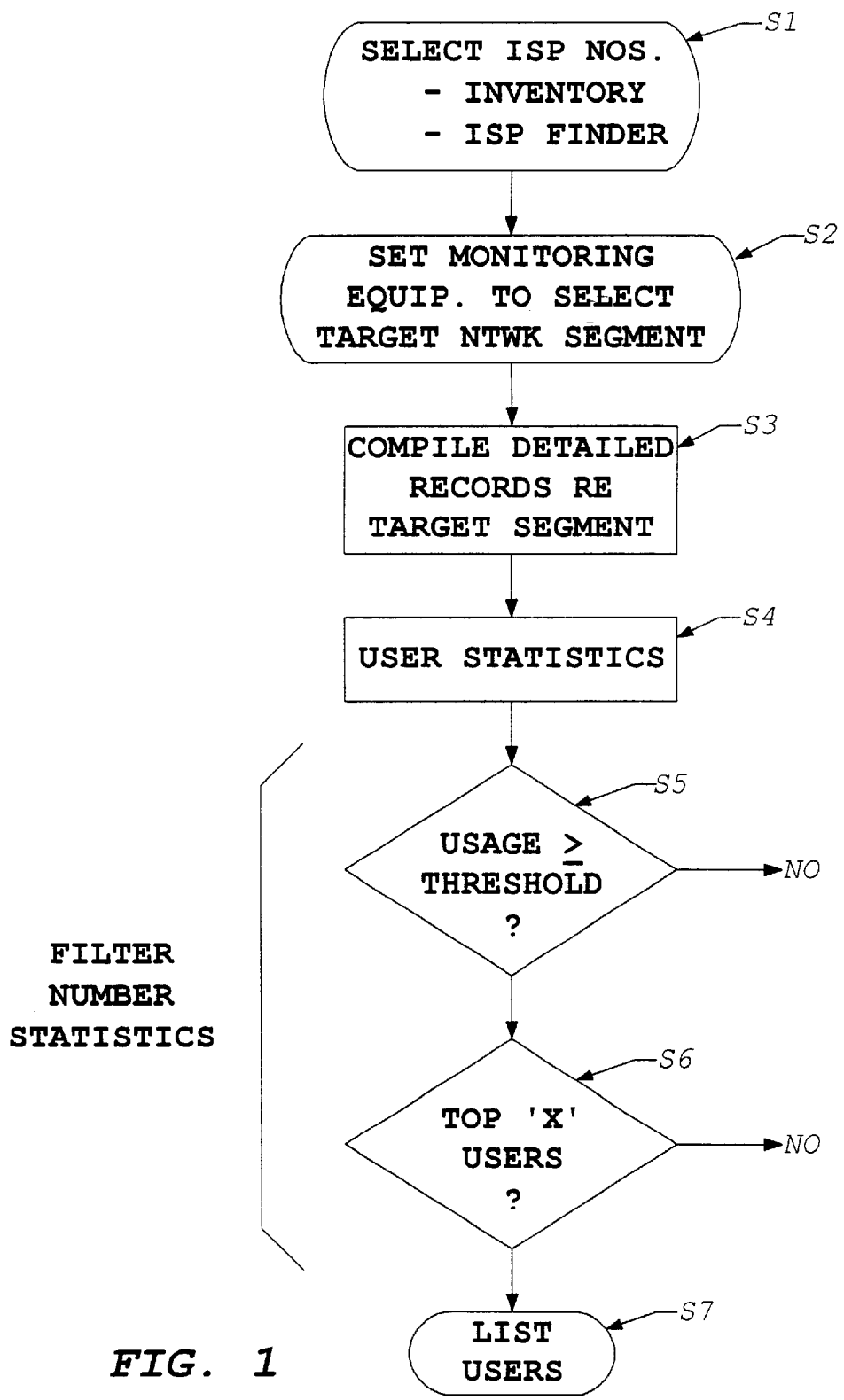
FIG. 1 is a high-level flow chart, helpful in explaining the steps of an exemplary method of finding an Internet user in accord with the invention.

FIG. 1 is a simplified flow chart illustrating the major steps involved in an Internet user finder study in accord with the invention. Initially, a technician or network engineer sets up the study at least in part by selecting destination numbers of ISPs (S1). In a typical implementation for analysis of Internet access traffic through a LEC network, the operator selects destination numbers receiving service from an end office (EO) that has exhibited traffic congestion problems. The technician may obtain the ISP numbers from some existing inventory of such numbers. In the preferred embodiment, the technician first runs a traffic study to find the ISP numbers, as discussed more later with regard to FIG. 2.

To find the high-end Internet users, once the ISP access numbers are identified, it becomes a matter of looking at the ISP terminating numbers and looking at the originating numbers in call detail records (CDRs) of calls to those numbers. From analysis of the CDRs, it is possible to identify the numbers of callers having the most usage to those ISPs, for example based on MOU or CCS or peg count. MOU (minutes of use) and CCS (centi-call seconds) are measures of total connect time to for all calls, in this case, from a specific user to any ISP during the study. A peg count is a raw number of calls, in this case the number of calls from a specific user to any of the identified ISP numbers.

Preferably, the network operator deploys a system to monitor certain management data messages used by the network. Examples of management data include interoffice signaling messages and messages sent from network offices to an accounting office for record keeping and billing purposes. To implement the Internet user finder analysis, the technician programs the monitoring equipment to collect CDRs for calls through a congested segment of the network targeted for the study (S2).

In our end office example, the technician sets the monitoring equipment to select the congested end office as the target. As discussed more later, this may involve setting translations in one or more offices causing them to send automatic message accounting (AMA) messages from that office to a billing system, or this may involve setting monitors on interoffice signaling links to catch call set-up signaling going to and from that office.

Once the monitoring equipment is programmed, the study runs for some period of time. During this time, the monitor equipment compiles detailed records of calls through the targeted segment of the network (S3). For example, the monitoring equipment might compile call detail records for all calls through the congested end office in one twenty-four hour period.

The data compilation provides a substantial quantity of detailed information, which forms the user statistics (S4) for further study. At this point, the statistics may include one or more special summary tables designed to facilitate the study and/or the complete call detail records compiled over the period of the study.

The Internet user finder routine then executes one or more steps to filter the information based on call statistics relative to the callers' telephone numbers. This filtering progressively narrows down the set of calling party numbers under consideration until a collection or subset of candidate numbers is developed, where all the numbers in the remaining subset exhibit traffic statistics satisfying all of the filter criteria.

In the Internet user finder application, the filter operations collect originating telephone numbers for which the statistics indicate a high volume of calls to the identified telephone numbers of Internet service providers (ISPs). In the illustrated example, this involves identifying all users having some high level of usage, e.g. above a threshold (S5) and the presentation of the list of some top number 'X' of those users (S6), for example the top 25 of the identified high volume users. We envision use of other filter criteria. For example, the filter steps might first identify telephone numbers of callers having usage at or above the threshold, and from those numbers, cull out a subset of prime candidates for parties who also called an ISP during a predetermined peak busy period. Data records for users' calls not meeting the filter criteria at steps S5 and S6 may be discarded.

The result at step S7 is a list of originating telephone numbers for the top X users that had more than a minimum amount of Internet usage during the study period. In our example, these calling party telephone numbers represent candidate numbers identifying high-end users of Internet services provided out of the congested end office. The CDRs used in this study may relate to all calls that the network completed or attempted to complete to the ISPs served out of the targeted end office. This includes both intra-office calls and inter-office calls. The resulting list of user numbers therefore includes numbers of calling parties served out of the same end office as well as telephone numbers of many callers served through other end offices. This list may include numbers of some callers obtaining their telephone services from other carriers.

One business need for such a traffic study is to allow the LEC to market advanced data services, such as asynchronous digital subscriber line (ADSL) service, to known high-end Internet users. Another use for the user identification is to enable engineering personnel of the LEC to determine the location of the heaviest concentration of high-end users, to facilitate engineering solutions to the congestion. The finder study may run for a single day, and the analysis results may be available the next morning. Thus, the study produces meaningful results essentially in real-time.

As noted, the preferred embodiment of the user finder study utilizes an ISP finder study to select the destination numbers for use in the user finder program. It may be helpful at this point to consider the ISP finder study in somewhat more detail.

Figure 2:
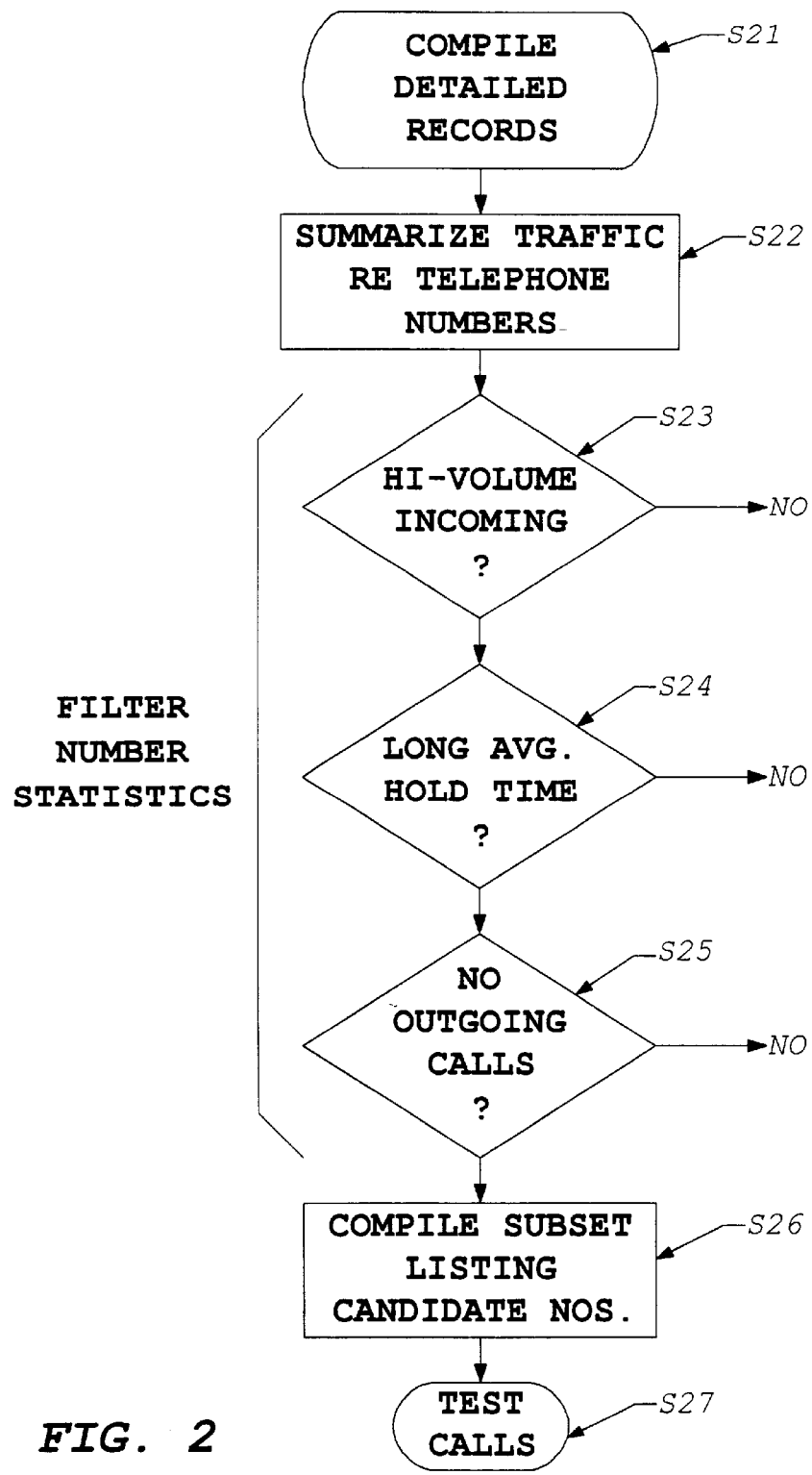
FIG. 2 is a high-level flow chart, helpful in understanding an ISP finder method useful in implementing the user finder methodology of FIG. 1.

FIG. 2 depicts the high-level process flow of a method for finding telephone numbers of ISPs. As in the user finder study, the network operator preferably has deployed a system to monitor certain management data messages used by the network. The first step (S21) of the ISP finder process (FIG. 2) involves compiling data from the monitored messages to form detailed records of calls through the network. In a typical implementation, the results of this step include records for all calls through a selected portion of the network, e.g. through a particular end office suffering congestion-related problems.

The detailed call records are processed to create relevant summary information characterizing the call traffic through the selected portion of the network (S22). For example, at this point, the summary data will indicate the number of calls to each destination number as well as the time and duration for each call into or out of an office selected for study.

The ISP finder routine (FIG. 2) then executes a series of steps to filter the information based on call statistics relative to the terminating or destination telephone numbers. This filtering progressively narrows down the set of numbers under consideration until a collection or subset of numbers is developed, where all the numbers in the remaining subset exhibit traffic statistics satisfying all of the filter criteria.

In the exemplary ISP finder application, the filter operations collect telephone numbers for which the statistics indicate a high volume of incoming calls, long hold times and no outgoing traffic. Thus, in the process of FIG. 2, the step S23 serves to identify destination telephone numbers to which the network processed a high-volume of calls. This operation may identify all numbers associated with a number of incoming calls meeting or exceeding a threshold. Alternatively, the process may select some arbitrary number of destinations having the highest incoming call volumes. Data relating to destination numbers having a relatively low volume of incoming calls may be discarded.

From the numbers identified in step S23, the process now identifies those numbers for which the calls exhibited a long average hold time per call (S24) Average hold time associated with one of the numbers is calculated by dividing the total connect time for calls to or from the telephone number by the total number of calls for that number. The total calls may be the count of all calls initiated or the count of all calls completed for that destination number. Again, Data relating to telephone numbers not satisfying the criteria, i.e. having a relatively low average hold time, may be discarded.

At this point, the first two filter steps (S23, S24) have culled the data down to identify a list of those numbers satisfying the criteria for high volume and long hold times. Depending on the level of accuracy desired, this list of candidate numbers may actually be sufficient. However, the procedure may go through another filter operation to determine whether or not there were any outgoing calls associated with each number (S25). This operation deletes numbers for which there were outgoing calls from associated stations. The result at this point (S6) is a small subset listing of the destination numbers found to satisfy all of the filter criteria, i.e. high volume, long average hold time, and no outgoing traffic.

If further confirmation that the numbers are those of ISPs is desired, a carrier technician can make telephone calls to the candidate numbers (S27). If the technician hears a modem answer tone, then the telephone number points to a data device of the type that might be operated by an ISP. Actual tests of the procedure shown in FIG. 2 have produced candidate number lists at S26 that identified ISPs to an accuracy of 95% or better when tested by follow-up calls (S27).

To perform user finder studies in accord with the invention requires efficient collection, preparation and analysis of traffic data for a communication network such as the public switching telephone network. The present invention also encompasses certain specific applications of the traffic tracking technology as applied to the finder studies.

Figure 3:
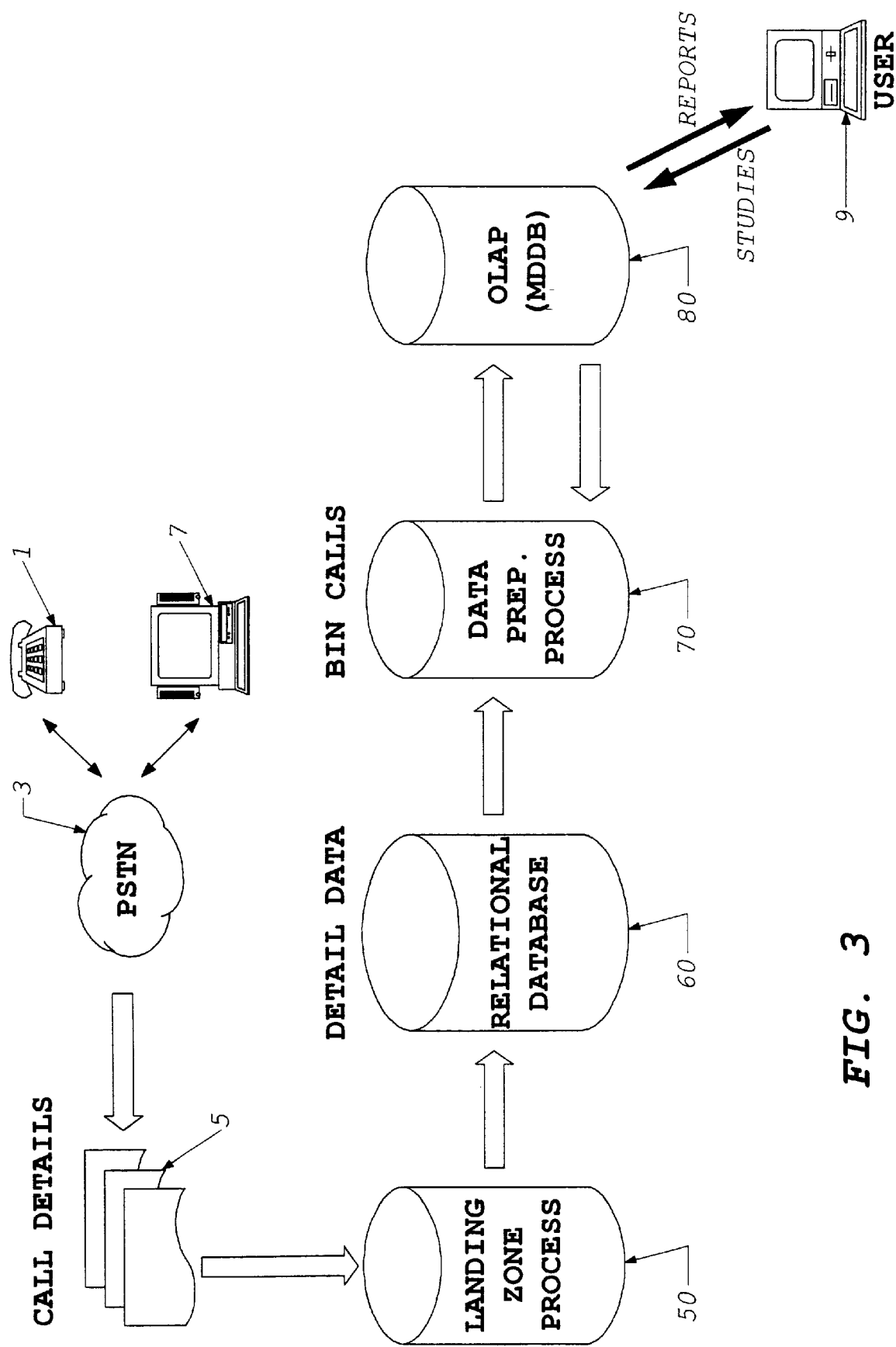
FIG. 3 is a block diagram showing the high-level functional aspects of a traffic track system for implementing the user finder and ISP finder methods of FIGS. 1 and 2.

FIG. 3 provides a high-level illustration of the functions involved in traffic tracking studies, including studies used to find users of targeted services. Typically, customers using telephones such as the telephone 1 make calls through the public switching telephone network (PSTN) 3. The PSTN provides switched connections between calling and called stations. In accord with the invention, the network billing equipment and/or certain signaling equipment in the PSTN 3 receives messages and accumulates records 5 of the details of the calls. The call detail 5 for each call includes a wide variety of different items of information about the call. For example, the information may include calling and called party numbers, the time of the call, the duration of the call if completed, the type of release if terminated without completion, identification of office(s) serving the call, etc. The PSTN 3 accumulates similar call detail records 5 for calls to and from data devices, such as calls from the personal computer (PC) 7 to ISPs discussed later.

The call details 5 are supplied through a database input procedure 50, referred to as a "landing zone" process. The landing zone serves to format the data and load the call details into appropriate tables in one or more relational databases 60. An example of appropriate database software is available from Oracle.

In the preferred embodiment, the relational database stores call details derived from PSTN billing records and from monitoring of interoffice signaling messages. The ISP and Internet user type finder studies may be based on either one or both of these different types of records compiled and loaded in the relational database 60. The relational database 60 stores the bulk detail data in an accessible form. However, still further processing is needed to allow analysis and output of the results in desired aggregate forms. Data from the relational database 60 is prepared and uploaded in process 70 for input for On-Line Analytical Processing (OLAP) 80, which preferably takes the form of a multi-dimensional database (MDDB) with an integrated presentation layer.

The data preparation process 70 summarizes details of calls and categorizes calls into logical groupings. One other function of the data preparation 70 is categorizing calls into "bins" based on the time and duration of the calls.

The data preparation process 70 also may involve modifying the call details by application of reference data from other sources, such as profile or service information of one of the parties to the call. In this part of the data preparation operation for the user finder study, one specific purpose is to combine call detail records, from AMA or SS7, with external support system data. For the Internet User finder application, this operation might identify the caller's phone number, the associated OE, the trunk number, the trunk group ID, etc. Preferably, this part of the preparation utilizes middleware that takes the form of a relatively universal system, with an interface to other data systems, whether it is for forecasting or for looking at marketing data, demographic data, etc.

The processed call detail information is uploaded to the OLAP 80. The OLAP process 80 analyzes the prepared call details and compiles data into reports, for output to a user's terminal 9. The OLAP process provides certain study management tools as well as the graphical user interface (GUI). For example, the OLAP system 80 receives the inputs and presents outputs via the user terminal 9, to set up study models, to set-up specific studies using established models and to present study results. As noted, the preferred embodiment of the OLAP software is a multi-dimensional database (MDDB) with an integrated presentation layer.

The multi-dimensional database (MDDB) 80 captures and stores high level summary data and displays it through the user terminal 9 in a variety of ways. The MDDB enables the user to overlay multiple dimensions when viewing the data, for example, showing originating traffic from one area code generated during certain hours of the day with an average call holding time greater than a specified threshold. The preferred MDDB offers the manipulation of data in a cube concept, where data can be approached from many different directions, providing different slices or views of the data. The preferred MDDB also uses a "drilling down" feature to slice or roll-up (aggregate) data based on the metrics (Minutes of Use, Average Holding Time, Busy Hour identification, etc.) required. The drill-down feature enables the user to access the raw call detail information, when necessary. As one example of drill-down, having found an ISP, a user might drill-down into the call details to identify originating offices for calls to that ISP or even telephone numbers of subscribers calling that ISP.

The application on the MDDB may also provide another point at which the user may access external reference data. For example, having found candidate numbers for ISPs, the application may compare the numbers to those of known ISPs, and reduce the list to a list of new ISP numbers.

The translation in the data preparation operation enhances the CDR data before analysis. For the user finder application, the MDDB 80 enables further matching or translation of the data after the actual analysis. For example, after finding the user numbers, the finder application in the MDDB 80 might allow the technician or engineer to select user numbers from the results and obtain name and address information corresponding to those user numbers. The subscriber's address information may be useful, for example, to allow marketing to target particular users or to enable the engineer to decide where geographically to deploy new advanced subscriber loop carrier systems.

The MDDB allows export of data, e.g. to copy a particular presentation from the MDDB into a spreadsheet such as into Excel. The user can then do his own analysis in Excel.

At a higher level, the MDDB enables presentation of aggregate traffic pattern data. For example, it is possible to display the Internet traffic as a percentage of all traffic out of a particular end office, either based on peg count or usage (e.g. MOU or CCS).

Multi-dimensional database software providing these capabilities is available from Gentia Software, Inc. of Wakefield Mass. under the product name of Gentia DB. The Gentia DB is a fully OLAP-compliant multidimensional database. Similar to Essbase, it is loaded with data derived from various company data sources, and is pre-consolidated. Gentia supports an "unlimited" number of dimensions, as well as multiple hierarchies within a dimension. It is a fully object oriented visual development environment, with a library of predefined objects, and provides an OLAP database with tools for loading, analysis, querying, and reporting.

Gentia runs on multiple platforms and is scalable across a large system. The multi-dimensional database program could run on a server, and the relational database 60 might run on a separate server. Alternatively, two or more of these databases may run within one computer system or server. The server running the multi-dimensional database (MDDB) 80 is accessed by multiple user work stations 9. Although the system may implement a client-server interface, preferably, the database 80 provides a web suite for a graphical user interface (GUI), enabling access using standard browser software in the workstations. The actual server may connect directly to the terminals 9 or communicate therewith through a data network, such as a private LAN or WAN or the Internet.

Logically, the data preparation software 70 runs as a separate (e.g. Oracle) relational database. The MDDB 80 is platform independent and may reside in the same server as the relational database or in a separate server. The data preparation software accesses records from the relational database and uploads the prepared data to the MDDB. The MDDB processes data from those records to generate analytical tables, reports and graphs.

In accord with the preferred embodiment of the invention, the user finder and ISP finder applications are just two of the specific study applications running on the MDDB. The user finder application may be separate from the ISP finder application, or the results for the user finder operation may be obtained by drilling down into the CDR data used in the ISP finder study. The MDDB runs other applications, some of which may use results of these finder studies, such as an application to analyze trouble reports related to Internet traffic.

Figure 4:
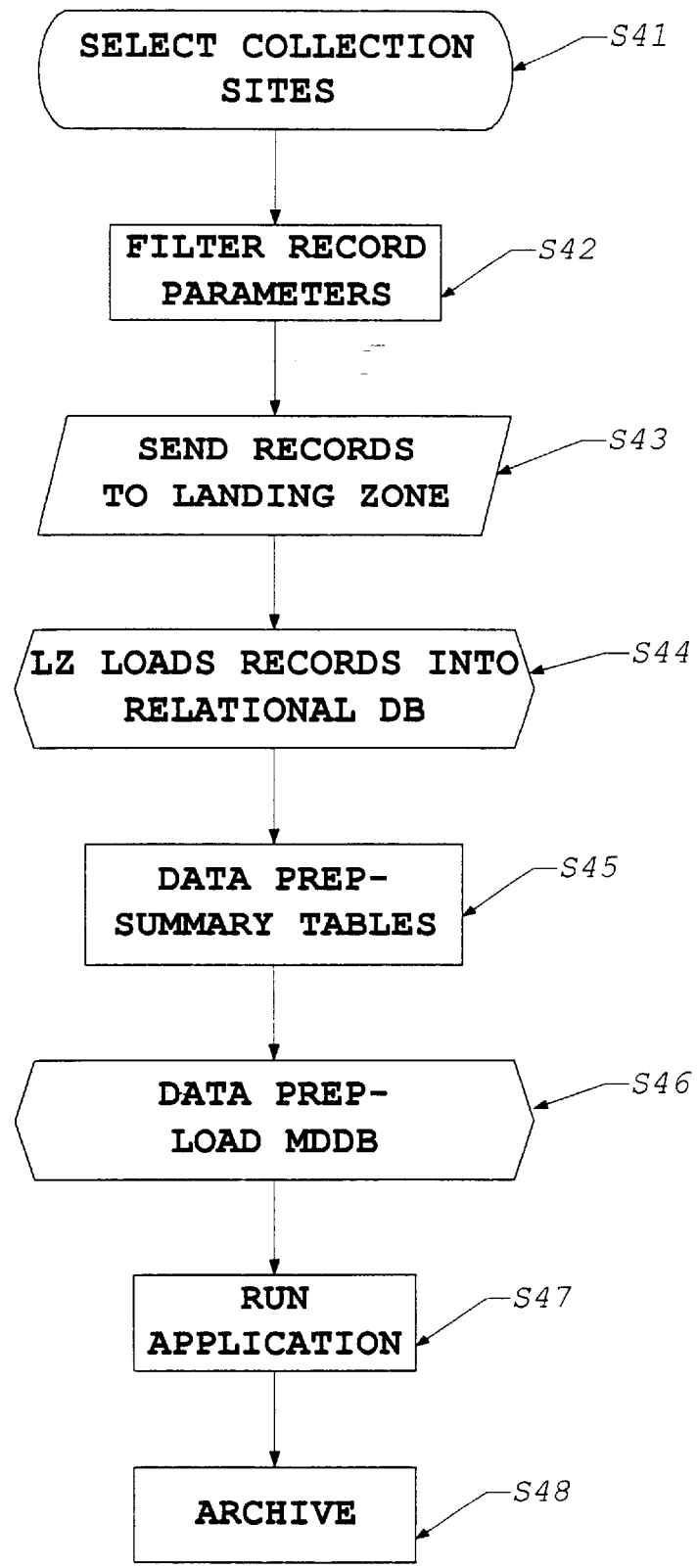
FIG. 4 is a flow chart illustrating the high-level process of overall management of a traffic track study, such as an ISP finder study and/or an Internet user finder study.

FIG. 4 is a flow chart depicting the overall flow of study management, including management of heavy Internet user finder studies and related traffic studies, using the traffic track system of the present invention. As shown at step S41, the process essentially begins with the user inputting a number of study selections. For a study based on AMA records, e.g. for an ISP finder study or for an Internet user finder study, this input would involve selection of one or more network offices for forwarding of AMA call records. For a study based on monitoring of interoffice signaling, for example, this would involve input of the three selections, the signal transfer point (STP) collection sites, a number of offices associated with each STP (up to 8 per STP) and the link sets to be monitored.

The network elements monitor the records, and filter the records by parameters (S42), based on the input selections. In step S43, the monitoring equipment transmits the records (CDRs) to the landing zone 50. The landing zone process 50 loads the records into the tables for this study established in the appropriate relational database 60 (S44).

The data preparation routine 70 prepares the staging and summary tables (S45). This involves the various translations using reference data, the binning or spreading of records to properly allocate usage time and the loading of data into the appropriate tables. The data preparation routine 70 then loads the tables into the MDDB 80 (S46). Within the MDDB software, a study application is run to present the data to the user (S47). The study application corresponds to the particular type of study, e.g. tandem, Internet heavy user finder, ISP finder, CLEC, etc. The study results also are archived (S48) for future reference. If necessary for the particular study, e.g. for CLEC billing reconciliation, the archiving may include the original record data from the relational databases.

Although not shown, upon completion of the particular study, the application running on the MDDB may enable the user to access other data 83. For example, in an application which identifies end user telephone numbers, such as an ISP finder application or an Internet user finder application, such other data sources 83 might provide the name and address of each identified user. This might enable the LEC to market certain services to the identified parties. Examples of such other databases 83 include CRIS, LMOS and LIDB (Line Identification DataBase).

Figure 5:
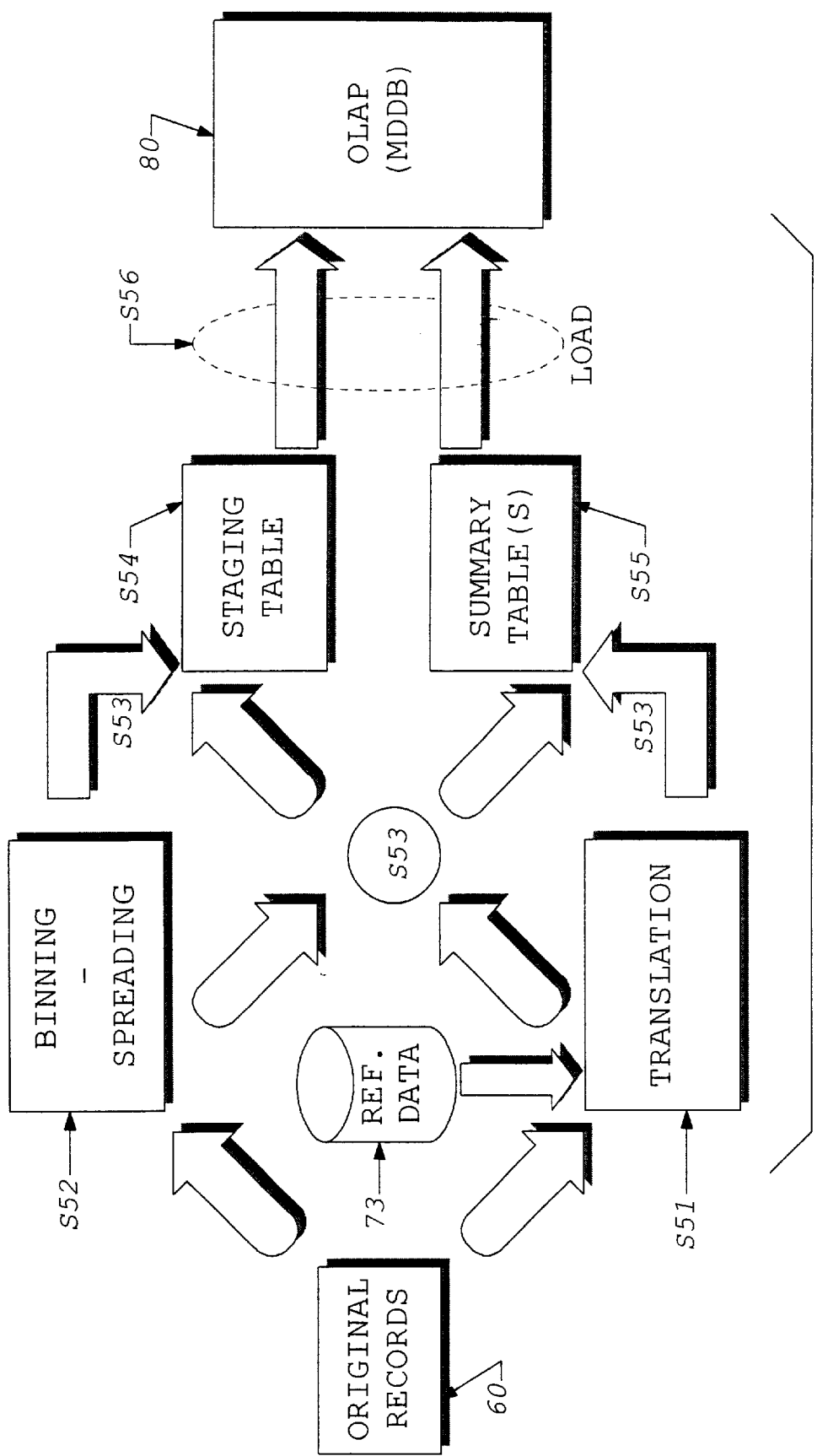
FIG. 5 is a flow chart useful in explaining the operations involved in data preparation in the traffic track system of FIG. 3.

FIG. 5 is a high-level process flow diagram depicting the operation of the data preparation routine 70. As noted, data preparation involves essentially three major functions, data translation, binning and assignment of records to tables.

Thus, in the drawing, the original records from the relational database 60, either AMA records or CDRs compiled from monitoring of interoffice signaling messages, can be translated using external reference data (S51). Typically, the reference data provides a translation of the data elements from a raw form to some more useful form. For example, in this process, the software may take the address information from the interoffice signaling messages or the NPA-NXX digits from telephone numbers included in the AMA records and access associated reference data 73. The reference data would provide translations of the record information into the Common language location identifier (CLLI) codes for identification of the serving switches. In this way, the enhanced records would provide descriptive identification of the switch serving the caller and/or the switch serving the called party.

The data preparation program 70 also executes an algorithm for binning or spreading of usage data from the records, to properly allocate usage that may extend over multiple hours to the appropriate hourly time periods (S52). For engineering purposes, it is important to know traffic loads by hours, particularly to identify typical peak busy hours and determine loads during such hours. Categorizing calls and CDRs by hours is significant here because CDRs often relate to calls that can span hours.

For these reasons, a significant operation of the data preparation process is to make sure that the calls are binned into the hours of the actual usage. For example, an Internet access call might start from PC 7A to ISP 7C at 8:15PM and last until release at 10:20PM. As such, the start-time hour would be the hour from 8 to 9 PM, but all those minutes of use should not appear to in that one hour. The binning process allocates 45 minutes of use in the 8 to 9 o'clock hour, 60 minutes in the 9 to 10 o'clock hour, and then 20 minutes in the 10 to 11 o'clock hour. To achieve this accurate binning of calls from the CDRs, the data preparation operation goes through every single CDR, examines the start time and duration and applies minutes of usage into the right hour of the day.

At step S53 (shown as multiple transfer arrows) the enhanced records resulting from the translation (S52) and the binning (S53) are compiled into one or more predefined tables, by application type. In the illustrated embodiment, the data preparation program 70 generates a staging table (S54) and one or more summary tables (S55). The staging table contains the complete enriched record information, whereas a summary table contains a more limited set of information to provide a desired summary of certain aspects of the traffic. For example, for the CDRs formed from monitoring of SS7 interoffice signaling, the staging table is the primary table used for binning all of the calls. The binned results also are forwarded to a second table or to a third table for summaries prior to input into the Gentia implementation of the MDDB 80. Other commonly used SS7 CDR tables include an "Office_Pair" table for tandem studies, an "Office_Summary" table for end office studies, and a "PIU" table for studies of the percentage of internet usage in comparison to the percentage of local usage.

At S56, the data preparation routine 70 uploads the resulting tables into the OLAP program, in the preferred embodiment, the MDDB 80.

The above discussion considered data preparation as a single routine, for simplicity. If the traffic tracking system compiles CDRs for both SS7 and AMA, it is preferred that these CDRs are compiled in two relational databases. As a result there would be two landing zone operations to load the databases and two data preparation routines operating on the databases.

A more detailed description of the major functions of the data reparation procedure may be found in commonly assigned application Ser. No. 09/188,713 entitled DATA PREPARATION FOR TRAFFIC TRACK USAGE MEASUREMENT, and the detailed disclosure of that procedure from that application is entirely incorporated herein by reference.

The data preparation routine may be written in PL/SQL language. The data preparation routine preferably runs on the same computer that maintains the relational database and effectively runs on top of the particular relational database application. The data preparation process accesses additional reference data 73 that may reside in the same or a separate computer system.

The data preparation function is an automatic process. Although there are some common aspects for all studies, data preparation actually is adapted to different types of studies.

To enable the automatic data preparation function, as part of the initial set-up of a study, the CDR data from particular sources is pointed at the appropriate data preparation function based on the study-type flag in each CDR. In a study of ISP traffic, for example, the data captured by the SS7 monitors 31 and the site processor 35 relating to calls routed through that tandem would go through the ISP traffic analysis version of the data preparation process when being transferred from an SS7 relational database to the multidimensional database 80.

Each study runs for some pre-determined period of time selected by the user. The results, however, are available in real or near real-time. The process could take several days or a week, depending on available processing power. Preferably, the results will be available overnight. For example, if a user sets up a study on Internet traffic to find users calling ISPs through the end office 13 for Sep. 10, 1998, the study begins at midnight, data is uploaded to the relational databases periodically for the 24-hour period on that date. The SS7 and/or AMA data records are collected into the landing zone at midnight and uploaded into the relational databases. Then the data preparation for the new CDRs begins at one o'clock (AM) the next morning and finishes loading into the MDDB about four o'clock (AM). The results of the study are available to the user at the beginning of the next business day, e.g. nine AM Sep. 11, 1998. For a study over a longer period of time, e.g. a month long study, the user can access the latest results each morning.

Thus, in accord with the invention, an application running on the MDDB identifies Heavy Internet Users. The heavy Internet user finder application helps to identify intensive users of the Internet, such as work-at-home users and telecommuters. These are people who are consistently on the Internet for several hours a day, week after week. Current engineering practices do not design the PSTN for this type of call with long holding times. Once these users are identified, it is possible to engineer network switches and trunks to better balance the traffic load. Information on heavy Internet users also can help to identify and define new services and products geared specifically toward long holding time data calls.

The Internet user finder application utilizes known numbers of ISPs. The technician implementing such a study may obtain this information from a number of sources, for example from postings on the Internet, from LEC Company records, etc. In the preferred embodiment, the technician first runs a traffic study to find the ISP numbers. For this purpose, the pre-defined models include a model and a corresponding application for the MDDB, for finding ISPs.

ISP Finder is an application developed in the MDDB system to cull out from the traffic measurements those call records that meet specific criteria consistent with terminating traffic to ISPs. In one version of such an application, for example, one search criteria looks for all telephone numbers receiving more than a threshold number of calls in a time period, e.g. more than 50 calls per day or more than 30 calls in an identified peak busy-hour. The application then determines which of those calls last more than a threshold average duration, e.g. 8 or 9 minutes each. The destination telephone numbers for such calls are then matched against a defined list of known ISPs, and the call detail record is attached to that ISP's data if there is a match. If there is no match to a known ISP telephone number, then the call detail is associated with a category called "New ISP". The technician or engineer can then view all the telephone number candidates in the New ISP category and any associated detail information of interest, to determine if the numbers in fact point to ISPs or to some other types of high usage service.

For the study of Internet users, the technician uses the ISP numbers found in the switch under study, including both known and New ISP numbers, as parameters for the user study. The intent of the Internet user finder application is to:
1) Identify the telephone numbers of lines Originating high volumes of usage/traffic to the ISP(s):
   (a) from all end offices to a specific ISP #,
   (b) from all end offices to a specific set of ISP #'s,
   (c) from a specific end office; and
2) Provide statistic on the identified Heavy Internet Users:
   (a) by MOU, CCS, peg count and AHT,
   (b) Hourly, Daily, Weekly.

There are two preferred study configurations. The first configuration implements a full office collection of all originating AMA records. The second configuration collects all terminating AMA records to specified ISPs.

A preferred implementation of the data analysis process for the Internet user finder study would involve the following steps:

I. Selecting a list of identified ISP numbers in a switch(s).
II. Viewing the aggregate originating traffic calling these ISP number(s) for a 24-hour period.
III. Creating a graph displaying the distribution of number of originating telephone numbers and the total minutes of use in 24-hour period.
IV. Creating a program that identifies individual originating telephone numbers that measure more than 300 total MOU to an ISP(s) Then create a report that lists these high Internet user numbers in descending order of usage with measures for call attempts, call completion's, failed attempts, and originating office CLLI code.
V. From the list of user numbers, cull out those numbers with measured MOU during the 3 PM to 9 PM time period. Then create a report of these high Internet user numbers in descending order of usage with measures for call attempts, call completion's, failed attempts, average CHT, and office CLLI code.
VI. Creating a report that lists the office CLLI codes in descending order of the total number of users identified in step 4.

Thus, from the data in the relational database 60, the MDDB 80 develops presentations to show a subset of high-end users. The presentation may show the top X (15 or 30 or 45, etc) users during the study period or all users with usage over a predetermined threshold. If based on a threshold analysis, the MDDB software enables the study user to define the threshold based on the peg count and/or on one of the usage measures (MOU or CCS). The display output may present the hourly usage patterns and then show which originating switch the users belong to, as well as the ten-digit number or OE for each identified high-end user.

The user study may be set up against an originating office or a terminating office. The study of the originating office identifies all users served through the office calling an ISP. The study of the terminating office identifies all callers to an ISP served out of that office. The user study may point to users who access a particular ISP number, users who access any number associated with a specific ISP, users who access any of the identified numbers of any ISP, etc. Different approaches are useful for different purposes. For example, identifying all users from one end office who access a particular ISP in another office may be useful in a study intended for upgrading of one or both offices and the trunks there between, to reduce congestion. The network planner might assign the high end users in one end office to a switch module that also connects to a new direct trunk to the office serving the ISP number. Within the office serving the ISP, the planner would connect that same trunk to a switch module that also serves the ISP equipment associated with the ISP number. The new direct trunk would reduce loading in the trunk network and overflow traffic through the tandem. The noted switch module connections would reduce the burden of inter-module connections within each office.

If the ISP receives service from a CLEC, the user study can identify all of the LECs customers who are accessing that ISP's number through transit into the CLEC network. So, if the CLEC is company A, it is possible to translate the NPA-NXX of the called ISP numbers into CLLI codes for the CLEC switches or even into an identifier for company A. For a study of two switches, the results would show all originating traffic out of either of those switches to ISP numbers having the CLEC's NPA/NXX, and from there the study would show the volume of such traffic. Using an SQL drill-down technique, it is then possible to find the originating numbers. If there are multiple ISPs in the one NPA-NXX it may be desirable to show the ISP numbers. As in the other studies, the results show the cumulative connect time, in this case though, for each of the users' numbers.

From the user numbers, the LEC can access other databases that it normally maintains for its telephone business, for example to provide the name and address of each high-end user if the LEC wanted to market some fast data service, such as ADSL. Examples of such other databases include CHRIS, LMOS and LIDB (Line Identification DataBase).

The identification of the callers can utilize the CDRs derived from SS7 monitoring, but preferably this analysis uses CDRs derived from the AMA records. The AMA records reflect all originating calls, whether or not the calls involve signaling for an interoffice connection.

A user study can be derived from an ISP finder study, by drilling down into the CDR data used for the ISP finder study, e.g. to identify the calling party numbers and associated usage. Preferably, the user study is set up as a separate study based in part on known ISP numbers. The ISP number may come from a variety of sources, such as various Internet posting services, LEC or CLEC records or from a previously completed ISP finder study.

As for the ISP finder study, the user study begins with an identification of offices of interest. For those offices, the SS7 monitoring and/or the AMA systems are set to collect all data on calls originated or terminated in those offices. The data is uploaded to the relational databases.

To further enhance the results for certain types of user studies, it may be helpful to analyze other data in the call records. For example, if the intent is to market ADSL services to high-end Internet users, it may be helpful to also study the blockage patterns for the high-end users found in the basic user finder study.

For this purpose, it is notable that the CDRs developed from the monitoring of SS7 messages include "release codes." Release codes indicate the reasons for call terminations, when calls are not completed as dialed. Examples include user busy, caller check, number change, out of service, facility rejects, etc. The CDRs capture these codes from the SS7 messages, and the traffic track analysis of the present invention can provide a variety of analytical tools and reports, using the release codes. For example, if there is a mass call-in, e.g. because of an Internet release of a document of national interest or the like, the analysis system can indicate how many callers got through and how many did not. For those that did not get through, the system can identify by major categories the principle reasons that calls did not go through, for example the number of calls released because the destination station (user) was busy, the number of calls released because no trunks were available, etc.

Having identified the high-end Internet users, it therefore is possible to drill down into the relevant SS7 CDRs to identify calls from those users to the ISP access numbers that went uncompleted and identify the blockage patterns encountered by those customers on those uncompleted calls. In the ADSL marketing example, the marketing department could then show such an identified user the number of blockages of each relevant type they suffered and how bypass through ADSL would eliminate blockages due to user busy conditions and due to lack of available trunk resources.

The present invention provides effective monitoring of various systems of a public telephone network and processing of the data derived from such monitoring, to enable analysis of various patterns of the traffic through the telephone network. The pattern analysis and recognition identifies calling parties associated with certain types of users, such as heavy users of ISP services. The system preferably facilitates subsequent analysis of traffic through the network from the identified callers, for various engineering and business purposes. In the preferred embodiments, the monitoring involves capture of interoffice signaling messages and accumulation of certain accounting records, relating to interoffice and intra-office telephone calls through the network. To facilitate understanding of the invention, it may be helpful at this point to review the structure and operation of the telephone network, in somewhat more detail.

Figure 6:
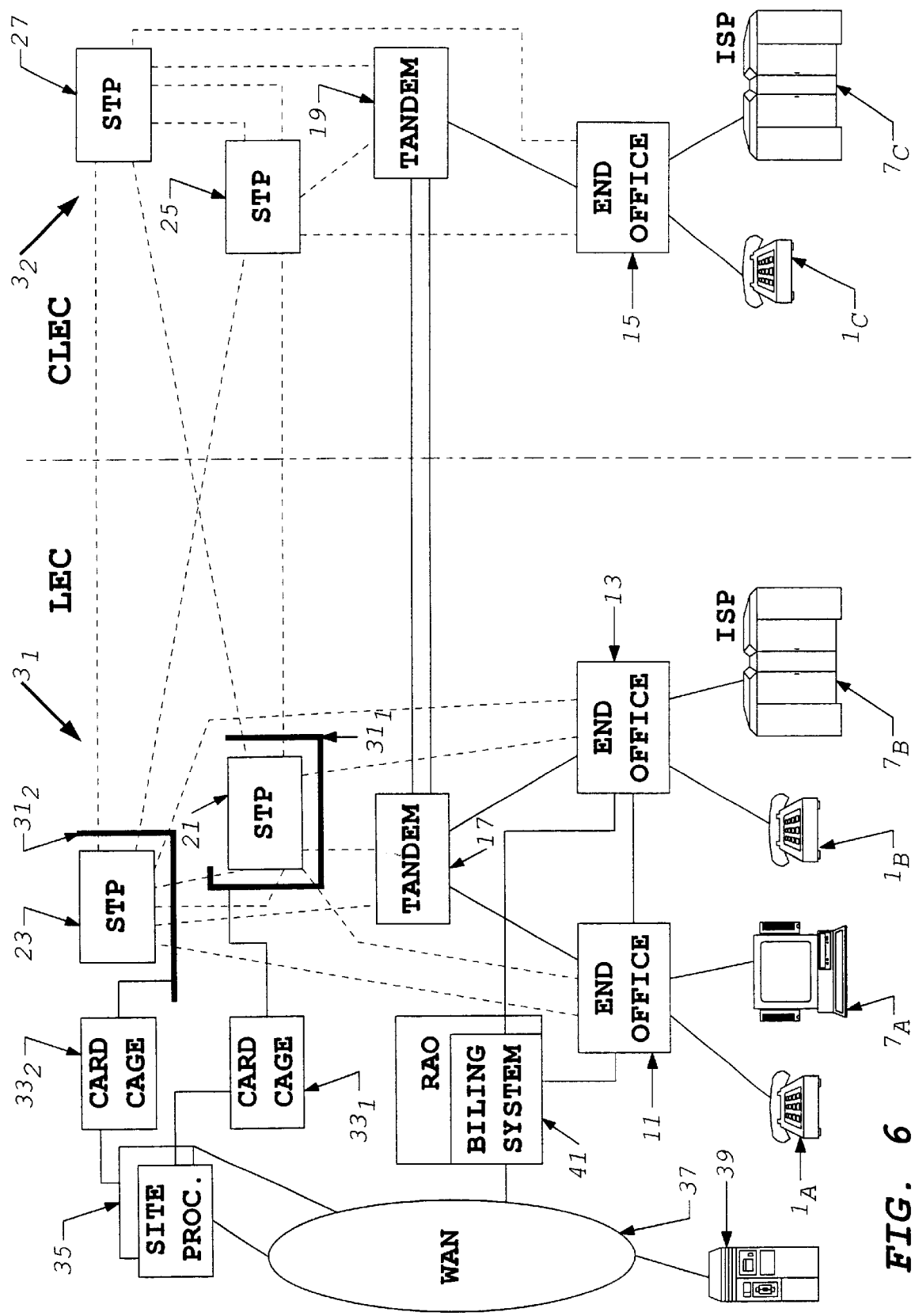
FIG. 6 is a block diagram illustrating a switched telephone network and elements used to capture and analyze call data from that network to implement traffic analysis applications, including the methods of FIGS. 1 and 2.

Referring to FIG. 6 there is shown a block diagram of a public switching telephone network and the SS7 (signaling system seven) network that carries the call control signaling for the switched network. In reality, the public network that we think of as the telephone network comprises many segments operated by different carriers, including local exchange carriers (LECs) and interexchange carriers (IXCs). For purposes of this discussion, FIG. 6 illustrates two such segments or sub-networks. One sub-network is a network $3_1$, operated by a LEC. The other sub-network could be that of an IXC or any other carrier, but for purposes of this discussion, FIG. 6 depicts a second network or segment $3_2$ operated by a Competitive Local Exchange Carrier (CLEC).

The switched portion of telephone network consists of a series of central office (CO) switches, which are conventionally referred to as signaling points (SPs) in reference to the SS7 network or a service switching points (SSPs) in reference to an intelligent version of the PSTN. Certain of these SPs comprise end offices (EOs) illustrated at 11, 13 and 15 in the drawing. Other SPs serve as tandem offices, illustrated for example at 17 and 19 in this drawing. Customer's telephone equipment connects through telephone lines or other links to the end offices. Examples of such equipment include normal telephone stations shown at $1_A$, $1_B$ and $1_C$ as well as various data devices such as the PC and ISP hardware shown at $7_A$, $7_B$ and $7_C$.

Each signaling point (SP) has a point code comprising a 9-digit code assigned to every node in the network. Messages communicated via the SS7 signaling network utilize the codes to identify source and destination SPs, and the traffic tracking system can use these point codes to identify messages relating to traffic through particular offices.

The end offices 11 and 12 represent end offices in the region of one operating company or LEC, whereas the end office 15 represents one of the end offices in the region of a different operating company, in this case a CLEC. Each operating company has its own network ID, which is used as the first three digits of the point codes of the SPs of that carrier's network.

Also, each end office resides within an area assigned NPA digits as an area code. Each exchange is identified by one or more three-digit codes referred to as NXX digits. Each such code corresponds to the NXX digits of an NXX-XXXX (seven-digit) telephone number or the three digits following the three area code digits (NPA) in a ten-digit telephone number. As a result, the NPA-NXX digits of telephone numbers also can serve as identifiers of end offices. Origination and destination telephone numbers appear in various SS7 signaling messages and various records that the offices create for billing and the like.

Digital trunk circuits, shown as solid lines, interconnect the switching offices of each network 3. Typically, within one carrier's network $3_1$ end offices, such as end offices 11 and 13, are directly interconnected by trunk circuits. For overflow traffic and/or for connections to other carrier networks, the offices 11 and 13 also connect via trunk circuits to a tandem office 17. In the CLEC network $3_2$, the end office 15 connects through a trunk circuit to a tandem 19 or direct to an end office. The LEC and CLEC networks $3_1$, $3_2$ interconnect through trunk circuits shown for example between the tandems 17 and 19, although end office interconnections are possible.

The present invention relies on monitoring of interoffice signaling messages and of certain records normally associated with billing functions. To understand these monitoring functions it may be helpful to review the signaling and billing record functions of the network. We will first consider interoffice signaling.

The SS7 type interoffice signaling network comprises a series of Signal Transfer Points (STPs) shown here at 21, 23, 25 and 27 and interconnecting data links indicated by dotted lines. Each STP in a network connects to the SP or SSP capable offices in that network via A links. Thus, in the LEC network $3_1$, the end offices 11, 13 and the tandem 17 connect to the STPs 21, 23 through A links. Similarly, the end office 15 and the tandem 19, in the CLEC network $3_2$, connect to the STPs 25, 27 via A links.

Within the LEC network $3_1$, the STPs 21 and 23 constitute a mated pair of STPs connected to each other via C links. Within the CLEC network $3_2$, the STPs 25 and 27 also constitute a mated pair connected by C links 58. Each of these mated pairs serves its respective transport area and/or carrier network. Persons skilled in the art will recognize that there may be multiple mated pairs per region or carrier, one pair for each designated transport area.

The STP 21 connects to the STP 25 via a B link, and the STP 21 connects and to the STP 27 via a D link. Similarly, the STP 23 connects to the STP 27 through a B link, and the STP 23 connects and to the STP 25 through another D link. As will be understood, the A, B, C and D links are physically identical links. The letter designations for these various links relate to cost in terms of ease of access.

The STPs in any mated pair have the same translations. Thus, the translations in STP 21 are the same as the translations in STP 23, and the translations in STP 25 are the same as the translations in STP 27. The translations control the message routing through the STP.

The STPs may connect to transactional database systems, such as Service Control Points (SCPs), Integrated Service Control Points (ISCPs) or the like. Such database systems, for example, provide call control information for a wide range of recently developed enhanced features. Other database systems, such as the Line Identification Database (LIDB) provide information for ancillary purposes, for example, for credit card validation, for enhanced versions of Caller ID, etc. The monitoring in accord with the traffic track invention captures messages going to and from the tandems or end offices. This includes messages exchanged between the offices and the database systems. Although possible, for our purposes, it is not necessary at this time to separately monitor the links to the database systems. Therefore, for simplicity of illustration, these databases have been omitted from FIG. 6.

The present invention may conduct finder studies based on capture and processing of the common channel interoffice signaling (CCIS) messages exchanged between offices, during otherwise normal call processing, typically implemented in the signaling system seven (SS7) protocol.

For SS7, typical application layer protocols include Transaction Capability Application Part (TCAP); Operations, Maintenance, Application Part (OMAP); and ISDN User Part (ISDN-UP or ISUP). TCAP provides the signaling protocols for exchange of non-circuit related, transaction-based information, typically for accessing databases such as SCPs. OMAP specifies protocols for certain specialized messages relating to maintenance and operations. Although the tracking system can capture and analyze TCAP and OMAP messages, for purposes of the presently preferred embodiments, the most relevant part is the ISDN-UP, sometimes referred to as "ISUP".

ISDN-UP specifies the procedures and message protocols for setting up and tearing down trunk connections for calls utilizing common channel interoffice signaling (CCIS). ISDN-UP messages, for example, include an Initial Address Message (IAM), an Address Complete Message (ACM) an Answer Message (ANM), a Release Message (REL), and a Release Complete Message (RLC).

The lower three layers of the SS7 protocol, the network layer, the signaling link layer and the data link layer, form the Message Transfer Part (MTP) of SS7, for the TCAP, OMAP and ISDN-UP protocols. The MTP therefore is common to messages for all applications and provides reliable transfer of signaling messages between network nodes. The MTP relays messages between applications running at different nodes of the network, effectively like a datagram type service.

For purposes of the MTP processing, each SS7 message includes a routing label in octets 2–11. Octets 15–N of the message contain the actual message, in the form of the fixed parameters, the mandatory parameters and any optional parameters. The lengths of the mandatory parameters field and the optional parameters field are variable.

Several of the traffic tracking studies rely on translation and/or analysis of certain addressing information from the SS7 messages, for example to identify originating offices for calls to newly discovered ISPs or high-volume Internet users. The routing label includes fields for both destination related addressing and point of origin addressing.

The destination or 'called party' address for the SS7 packet message itself includes three octets for origination point code information, for example member, cluster and network ID information, for the node on the SS7 network sending the message. The routing label also includes three octets for a destination point code (DPC).

In operation, the translation tables stored in an STP cause the STP to actually route based on the DPC without translating any of the DPC octets into new values. The called party address octets (6–8), however, may carry other types of called party addressing information and receive different treatment by the STP, such as a global title (GTT) and subsystem number (SSN) information. The STP examines a message signaling unit (MSU) type indication in each message to determine if there is a need for translation, e.g. from GTT to DPC, before routing the message.

The SS7 network constitutes a highly redundant data network, generally using 56K switched data circuits for the various links to and between the STPs. Because of the redundancy, different signaling messages for a given call may actually transit different routes through the SS7 network.

An SS7 monitoring system may be implemented on any carrier's portion of the PSTN. In the illustrated example, the LEC network $3_1$ has the monitoring and call detail compilation equipment, for the traffic tracking in accord with the present invention. According to the invention the LEC portion of the public switching telephone network (PSTN) is provided with a traffic monitoring and analyzing system comprising monitors 31, card cages 33 and one or more site processors or servers 35, of the type described in detail in the above discussed Pester Patent. One commercial implementation of such an SS7 monitoring system is currently available from Hewlett Packard, under the product name "AcceSS7".

FIG. 6 shows the sets of monitors or interfaces $31_1$, $31_2$ to the SS7 links to the STPs 21, 23 in diagrammatic form, as solid bold line across respective links. A card cage $33_1$ connects the monitors $31_1$ to a site processor 35. Similarly, a card cage $33_2$ connects the monitors $31_2$ to the same or another site processor 35. The monitors 31 may be conductively or non-conductively coupled to the links to serve as passive interfaces. The card cages 33 connect the monitors 31 to the site processor 35 for accumulation, storage and processing of the raw SS7 messages.

It is intended that multiple monitoring systems of this type serving different purposes may advantageously exist in the PSTN, for example for operations monitoring and/or fraud detection, in addition to the system illustrated from traffic tracking and analysis. For simplicity and clarity, however, only a single system is here illustrated.

The SS7 A link signaling in a completed call typically includes an Initial Address Message (IAM), an Answer Complete Message (ACM), an Answer Message (ANM), as described hereinabove, as well as a Release Message (REL) and a Release Complete Message (RLC) Since the common channel signaling system is intentionally redundant, the messages in a related set may be routed over different A links. For example, on a call from PC $7_A$ to ISP equipment $7_B$, the IAM may go through STP 21, whereas the ACM and ANM may just happen to go through the STP 23. The REL and RCL messages also may use different links and/or different STPs. It is therefore necessary to monitor an appropriate set of links and to reassemble the signaling pertaining to a desired transaction or signaling message set such as for a single call, to provide one call detail record or CDR. This is accomplished in the site processor 35 in a known manner as described in the Pester or Brockman et al. Patents.

It should be noted that the PSTN conducts signaling on all interoffice calls, and the monitoring system traps messages and compiles CDRs for all interoffice calls. In particular, the system provides CDRs for both calls completed to a destination station and calls that terminate without completion. For example, the system accumulates CDRs for calls that are blocked because the called line is busy, because there are no network resources available to the terminating end office (network busy), etc.

With the reassembled message sets the site processor 35 has the data to show the called and calling stations $7_A$, $7_B$ the start time of the call, the elapsed time of the call, the originating office, the terminating office and various other detailed data. By monitoring the SS7 signaling for all of the calls originating in, terminating in or passing through a designated switch, such as the switch 13, it is possible to analyze the traffic to identify particularly significant patterns.

For example, based on a pattern of calls through the tandem 17 to a certain number, it is possible to identify the number of an ISP 7C, even through that ISP is served through the CLEC switch 15. Knowing that number, it is possible to gather all of the desired information about calls going to the ISP 7C via an interswitch path, including the numbers of calling customers and the number of calls or minutes of use of such calls by each customer. Conversely, knowing the number of ISP $7_B$, it is possible to collect numbers of callers to that ISP, including numbers of callers receiving service from the CLEC network $3_2$. The assemblage of the raw call detail data desired for a particular purpose occurs at the site processor level.

One or more site processors 35 accumulate the CDRs for the traffic monitoring application of the present invention. Periodically, each site processor 35 transmits the latest set of CDRs over a private wide area network (WAN) 37, operated by the LEC for its internal business purposes. The WAN 37 may carry a variety of LEC network operations data. For purposes of the discussion, the WAN transports the CDRs from the site processor 35 to a server system 39 running a relational database 60 (FIG. 3) for the accumulated SS7 data.

The CDR compilation and forwarding routine in the site processor 35 executes a special procedure for long duration calls. If a call is in progress at the point in time for its programmed uploading to the relational database 60, say midnight, the site processor 35 creates a "call-in-progress" CDR, indicating the start time and duration of the call to that point. Later, when the call ends, the site processor creates another CDR as if the call started at the point in time (midnight) and lasted for the remaining duration of the call from that time until release.

It will be understood that some calls are completed through a single switch, such as a call from a PC (not shown) associated with the telephone 1B through end office switch 13 to the ISP 7B. Such intra-office calls will not generate the above discussed SS7 signaling and thus will not be reflected in the CDRs developed from such signaling. For such intra-switch calls, and for otherwise supplementing the call detail information derived from monitoring the interoffice signaling messages, the invention utilizes data accumulated from certain switch messages normally utilized for billing and other accounting purposes.

Various network elements, such as the switches 11, 13 and/or 17 of the LEC network $3_1$, generate automatic message accounting (AMA) records. Such records are used to provide call details to enable the local exchange carrier to bill for the completed calls, for example to bill the end users, to bill interexchange carriers (IXCs), to bill CLECs, etc. The AMA records may also provide call details for other network operations, e.g. for maintenance purposes.

In operation, a switch examines a customer's service request, typically the destination telephone number, and based on customer profile or service information determines if there is a need for AMA recording for the call. If so, the switch outputs AMA records for significant events in processing of the call. The AMA records are typically in the Bellcore AMA Format (BAF).

The AMA records from the switches go to one or more billing systems 41, typically in a regional accounting office (RAO). The records may be transported to the RAO by physical transport of data tapes, but preferably, each of the switches has an AMA Transmitter (AMAT) or the like coupled to an appropriate data link to allow electronic communication of the records to the RAO. Although shown separately, these data links may be logical links provided through the WAN 37.

In the RAO, the AMA data records are edited and checked for integrity and supplied to the appropriate billing system 41. For this purpose, a message-processing server (MPS) assembles the various entries relating to a call into a completed message. Any incomplete messages are analyzed for administrative purposes and fraud detection. The complete messages are loaded into the billing system 41.

For example, a billing system, which some carriers refer to as the Customer Record information System (CRIS), processes records for end user billing. The CRIS system calculates the monetary amount for each usage event, identifies the appropriate customer's billing account and posts the billable amount to that account. Another common example of a billing system is the Carrier Access Billing System (CABS) which LECs use to process AMA records to calculate and post tariffed charges for other carriers such a cellular companies, IXCs and CLECs.

The billing system 41 may spin-off the AMA data for completed calls, for ancillary purposes. In accord with the invention, the billing system transmits certain completed AMA message data to a server, which maintains an AMA version of the relational database 60. The billing system could transmit the AMA records for all calls through the network, but that would produce a massive amount of data, much of which is unnecessary for studies that are active at any given time. Preferably, the billing system 41 is programmed to forward AMA records only for calls that are pertinent to some on-going traffic track study, for example all calls terminating in an identified end office during a specified study period or all calls originating in the office under study.

The AMA system typically records call details only for billable calls, e.g. for toll calls but not for flat-rate local calls. However, for purposes of the traffic track studies, translations are established in the switches to accumulate and forward the AMA data for all calls of interest, e.g. for all calls passing through the LEC network $3_1$ coming from or going to the CLEC network $3_2$. Preferably, these added AMA translations are stored in all of the offices 11, 13, 17 but can be turned on or off, as appropriate for particular studies.

As will be understood by those skilled in the art, AMA equipment records call details at each stage of a connection. The calling and called party numbers are registered initially. An answer entry registers the time of connection, and the terminating entry registers the time of disconnect. A common identifier in each entry serves to link the entries relating to a particular call, to distinguish them from those of other calls. The processing of the AMA data in the RAO and billing system 41 assembles the entries for completed calls into complete messages directly analogous to the CDRs produced through SS7 monitoring. Any incomplete messages are analyzed for administrative purposes and fraud detection. For tracking purposes, the billing system 41 delivers the processed AMA call data for the particular study to the WAN 37. The WAN 37 in turn delivers the data to a central server system 39 running the AMA relational database system application.

Both the AMA components and the SS7 monitoring components accumulate call detail records. The AMA records relate to each completed call originating or terminating through a switch 11, 13, or 17 having active AMA reporting software. The SS7 records relate to each call (completed or not) through the LEC network $3_1$, which involves interoffice signaling for call set-up. These records for each call take different forms, depending on the equipment accumulating the data, and the two different types of records are uploaded into two different versions of the relational database 60 running in one or two computers within the server system 39.

Both types of call detail records are essentially flat files, containing detailed information about each call. Once uploaded through an appropriate version of the landing zone process 50 to the relational database 60, the records are available for data preparation and loading into the MDDB 80.

It may be helpful at this point to consider the processing of a data call through the network and the monitoring of SS7 and AMA messages for traffic tracking purposes. Therefore, consider the operation of placing an Internet access call from PC $7_A$ to telephone ISP equipment $7_B$.

The user at PC $7_A$ activates the appropriate software routine to initiate dialing of the main number of a hunt group connected from end office 13 to the ISP equipment $7_B$. The end office 11 makes an initial AMA record containing the calling party and called party numbers. The SP end office 11 generates an Initial Address Message (IAM) with a destination point code for the end office 13 and an originating point code of the end office 11. The IAM includes a variety of information needed for call set-up, including the dialed number. The end office 11 sends the IAM either to STP 21 or to STP 23. That STP examines the address information and its translations and routes the message offer the next appropriate link, in this case over the A link to the end office 13.

In response to the IAM message, the end office 13 may also make an initial AMA record. The office 13 then determines whether or not one of the lines in the hunt group corresponding to the dialed number is available. If at least one of the lines is available (not busy), the end office 13 generates an Address Complete Message (ACM) to indicate that it received the request for a call and that the called line is available. The end office 13 sends the ACM message back by simply reversing the origination and destination point codes and sending the message over an A link to one of the STPs 21, 23. The ACM may or may not go over the A link that carried the IAM to the end office 13, and it may go to the other STP of the pair. Again, the STP receiving the message examines the addresses and uses its translations to forward the message over another link to the appropriate destination, in this case the end office 11.

The end office 11 sends ringback tone over the line to the modem in the calling PC $7_A$. At about this time, the end office $7_B$ applies a ringing signal to the line to the called station $7_B$. If the PC $7_A$ provides audio output, the calling party may hear a ringback tone, and the caller and her data equipment await an answer.

The ISP equipment $7_B$ detects the ringing signal, and if operative, that equipment establishes an off-hook condition on the line to answer the incoming call. The end office 13 detects this new condition as an answer and interrupts the ringing signal on that line. That office may make an AMA answer record, including the time of connection. The end office 13 also sends an Answer Message (ANS) back through the SS7 network to the end office 11, indicating that the called station $7_B$ has answered. The end office 11 may also enter an AMA answer record.

At that time the necessary trunk circuits between the end offices are connected together and assigned to the call. The trunk connection may run through the tandem 17, which would require separate call set-up and signaling for each leg of the call to and from the tandem. In this example, assume that the trunk connection extends directly between the end offices. The end office 11 connects the line for the PC $7_A$ to the trunk circuit, and the end office 13 connects the line for the ISP equipment $7_B$ to the trunk circuit. At this point a complete voice-grade telephone connection exists between the two data devices, and the data devices can exchange modulated audio signals carrying various data between the user on PC $7_A$ and the internet accessed through equipment $7_B$. Hours later, when one of the parties terminates the sessions, the offices 11, 13 exchange REL and RLC messages via either of the STPs 21, 23 as part of the procedure for tearing down the call connection over the trunk circuit. One or both offices make an appropriate AMA record of the call termination, including the time of disconnect.

During this call processing, if the SS7 monitors are active, the monitors 31 and card cages 33 capture and forward all of the SS7 messages relating to the call to the ISP $7_B$ to the site processor 35. The site processor compiles data from the various message into a CDR and forwards that CDR through the WAN 37 and the landing zone 50 to the SS7 version of the relational database 60.

If AMA monitoring is active, the switch in end office 13 and/or that in the end office 11 create and send the AMA messages to the billing system 41 in the RAO, regardless of whether or not this is a toll call. Thus, at the various stages of call processing, the billing system receives standard AMA messages regarding the call. The billing system 41 compiles all of these AMA messages into a completed AMA message set, which serves as the AMA CDR regarding the exemplary call. For purposes of the traffic tracking studies, the billing system 41 forwards the AMA CDR through the WAN 37 and the landing zone 50 to the AMA version of the relational database 60.

Similar SS7 and AMA monitoring occurs on calls from a data device at location $1_C$ to the ISP equipment $7_B$. If active, the SS7 monitoring system would compile CDRs for such calls. If AMA reporting is active in the end office 13, the billing system 41 accumulates AMA message sets for the CDRs of such calls. Thus, the user finder routine of the present invention can identify users calling from other carriers' networks, such as from the CLEC network $3_2$.

In an environment where there will not be constant and simultaneous data collection from all links off of each site processor or from each switch, the system operates under the concept of a "study". This study concept is the means or unit of requesting data collection. Each study is assigned a unique identifier and a "type" flag. The study is the trigger for activating specific sites/links and for identifying the application(s) or model(s) needed for analysis. As such, the study triggers activation of specific application loader processes between the relational databases and the corresponding application in the MDDB.

As part of the study management processing, each study is assigned an identification number, during initialization. The site processor 35 includes the appropriate study identifier in the CDRs compiled from the SS7 messages. Similarly, the billing system 41 includes study identifiers in AMA detail records, which it forwards to the relational database. The landing zone processing uploads the records into relational tables, corresponding to the study identifier. The data preparation operation 70 also prepares the data as required by the parameters for the particular study number and type and loads the data into the appropriate study tables within the MDDB 80. The OLAP processing allows a user to select an application, view a list of studies having a type identifier corresponding to the application, and then select and access results of one of those studies.

The web suite software 85 together with the MDDB software 81 performs all necessary OLAP processing. As part of this function, the software implements a Data Collection and Study Management Tool set, which enables the user to set up and control studies using the traffic track system. The detailed description of the MDDB operations and this Tool set from the above cited copending case U.S. patent application Ser. No. 09/188,713 is incorporated herein by reference.

Thus, with CDR data compiled in the relational database 60, the MDDB 80 enables a technician or engineer to analyze the data in accord with a number of different traffic models defined by the applications available within the MDDB. Several of these applications involve analysis of traffic patterns to find specific types of users. In the Internet access case, these users include the ISPs and the high volume users calling the ISP numbers. Other relevant studies utilize the results of one or both of these finder studies to analyze the traffic through the network that causes congestion.

The finder programs preferably are written in Structured Query Language (SQL) language and generally operate directly on the particular relational database (AMA or SS7). In the preferred embodiments, the relational databases are Oracle databases. The Gentia MDDB preferably performs the OLAP processing, including the user interface functions that enable a user to execute the finder application and related programming. The technician could write queries directly against that relational database, but preferably, the user interacts with the MDDB, and the MDDB launches the appropriate queries. For example, if study data is collected for traffic through the end office 13, the MDDB program will translate an ISP finder request to an SQL command. The command might initiate an SQL query to drill-down into a selected record set and find any terminating number that had a peg count greater than 1200 and an MOU more than 3600 (large traffic, long hold times), or whatever the user selects for threshold values.

A comprehensive ISP analysis process would involve the following steps:
  I. Start with full office data
  II. Run ISP Finder
  III. Use ISP Finder results to study ISP Hourly Trends to understand the particular aggregate usage patterns
  IV. Run a Communities of Interest analysis to identify the originating end offices with the most usage
  V. With the "hot spot" end offices identified at IV, run a High Internet User Finder study to identify the highest originating users and their usage patterns.

The traffic track technology described in detail above has applied to analysis of the call traffic through the PSTN. However, the technology may be adapted to study other types of telecommunication networks, such as cell or packet data networks, cellular networks, etc.

As described above, the SS7 monitoring system traps, messages from identified links going to and from the STPs initially compiles records from those messages at the site processor level. Other forms of monitoring of the interoffice signaling fall within the scope of the invention. For example, the function of the site processors might be rolled up into processor functions on the card cages. Also, a number of STP vendors have products that can supply message copies to monitoring ports, such that the STP itself performs the trapping function.

From the foregoing it may be seen that the system and methodology of the invention provide a powerful and flexible tool for performing varying investigations and surveillance. Thus, as examples, it is feasible to identify ISPs, determine the source of the largest amount of traffic to the identified ISPs, and the optimal solution to the Internet related overloading.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method for analyzing calls in a telecommunication network of a carrier, the method comprising the steps of:
    identifying one or more destination telephone numbers of a type of customer subject to a target type of call-in service;
    compiling data records of calls through a portion of a telecommunication network of the carrier to the identified one or more destination telephone numbers;
    analyzing the data records to identify one or more certain callers, each certain caller being identified as having a high volume of usage associated with one or more calls to the identified one or more destination telephone numbers; and
    reporting identities of the one or more certain callers.

2. A method as in claim 1, wherein the step of analyzing comprises identifying callers having usage on calls to the identified one or more destination telephone numbers exceeding a threshold.

3. A method as in claim 2, wherein the usage comprises total connect time.

4. A method as in claim 2, wherein the usage comprises number of calls to the identified destination numbers within a predetermined period of time.

5. A method as in claim 2, wherein the step of analyzing further comprises culling out a list of those identified callers having made at least one of the calls during a peak busy interval.

6. A method as in claim 1, wherein the step of identifying one or more destination telephone numbers comprises:
    analyzing data records of calls through the portion of the telecommunication network to identify each destination telephone number receiving a high volume of incoming traffic for which calls thereto exhibit a long average hold time.

7. A method as in claim 1, further comprising:
    accessing reference data; and
    using the reference data to translate an item of information from a data record of a call from one of the identified callers into descriptive information.

8. A method as in claim 7, wherein the descriptive information identifies an office of the telecommunication network assigned to provide switching services relating to either the one identified caller or to one destination number.

9. A method as in claim 7, wherein the item of information comprises a telephone number of the one identified caller, and the descriptive information identifies a subscriber that has been assigned the telephone number of the one identified caller.

10. A method as in claim 9, wherein the descriptive information includes an address of the subscriber.

11. A method as in claim 1, wherein the step of compiling of data records of calls through a portion of a telecommunication network comprises:
    monitoring interoffice signaling messages for the calls through the portion of the telecommunication network; and
    compiling the data records from the interoffice signaling messages.

12. A method as in claim 1, wherein the step of compiling data records of calls through a portion of a telecommunication network comprises:
    generating automated accounting messages for events in processing of each of the calls through the portion of the telecommunication network; and
    compiling a completed message set as the data record for each of the calls from the automated accounting messages.

13. A system, for use with a telephone network, for identifying originating telephone numbers as candidate numbers believed to be associated with callers to a particular type of service, comprising:
    means in communication with elements of the network for compiling detailed records for calls processed through a portion of the telephone network; and
    a server system, in communication with the means for compiling, for receiving and analyzing the detailed records to identify each calling party telephone number satisfying predetermined criteria as a candidate telephone number, the predetermined criteria comprising:
        at least one call to a destination number associated with the particular type of service during a predetermined study interval, and
        usage associated with the at least one call meets or exceeds a threshold value indicative of high volume usage.

14. A system as in claim 13, wherein the usage threshold value comprises a predetermined number of calls to a destination number associated with the particular type of service during the predetermined study interval.

15. A system as in claim 13, wherein the usage threshold value comprises a specified amount of total connect time for the at least one call to a destination number associated with the particular type of service during the predetermined study interval.

16. A system as in claim 13, wherein the particular type of service comprises access to a data network.

17. A system as in claim 13, wherein the criteria further comprises at least some usage associated with at least one call occurring during a peak usage interval associated with the particular type of service.

18. A system as in claim 13, wherein the server system comprises:
    1) a landing zone routine;
    2) a relational database, wherein the landing zone routine loads the detailed records for calls into files in the relational database;

3) a data preparation routine for processing the files in the relational database to enrich the information of the detailed records for calls in a manner facilitating the analysis;
4) an on-line analytical processing routine receiving the enriched information; and
5) at least one application running in the on-line analytical processing routine, for presenting results of the analysis based on the enriched information.

19. A system as in claim 18, wherein:
the database comprises a relational database; and
the on-line analytical processing routine comprises a multi-dimensional database.

20. A system as in claim 13, wherein the means for compiling comprises:
monitors coupled to interoffice signaling links of the telephone network for trapping messages from the links; and
a least one processor receiving the trapped messages and compiling data therefrom to form the detailed records for calls processed through the portion of the telephone network.

21. A system as in claim 13, wherein the means for compiling comprises a system for processing a plurality of the accounting messages regarding each call through the portion of the telephone network to form one of the detailed records.

22. A system as in claim 21, wherein the system for processing comprises a billing system of the telephone network.

23. A system as in claim 22, wherein the system for processing further includes switching offices of the telephone network for transmitting automatic message accounting information regarding calls processed through the portion of the telephone network to the billing system.

24. A method of identifying heavy users of Internet access services through a switched telephone network, the method comprising the steps of:
selecting one or more destination telephone numbers of Internet service providers for study;
compiling data records of calls through at least one switching office of the telephone network originated to the selected one or more destination telephone numbers;
analyzing the data records to identify one or more callers, each generating a high volume of usage associated with calling to the selected one or more destination telephone numbers; and
reporting identities of the one or more certain callers.

25. A method as in claim 24, wherein the step of selecting comprises analyzing data records of calls through the at least one switching office of the telephone network to identify destination numbers having a high volume of incoming calls and a long average hold time.

26. A method as in claim 24, wherein the step of analyzing comprises identifying originating telephone numbers of callers having a cumulative usage to the selected one or more destination telephone numbers that meets or exceeds a threshold value.

27. A method as in claim 26, wherein the threshold value comprises a predefined minimum connect time.

28. A method as in claim 27, wherein the threshold value comprises a predetermined minimum number of calls within a defined time period.

29. A method as in claim 28, wherein the defined time period consists of a peak busy period for Internet access traffic.

30. A method as in claim 24, wherein the step of compiling comprises:
trapping interoffice signaling messages sent to and from the at least one switching office during processing of said calls by the at least one switching office; and
compiling information from the trapped interoffice signaling messages for each of said calls to form a call detail record regarding each of said calls.

31. A method as in claim 24, wherein the step of compiling comprises:
creating automatic accounting messages regarding events involved in processing of each of said calls by the at least one switching office; and
compiling a complete set of call data from the automatic accounting messages for each of said calls to form a call detail record for each of said calls.

* * * * *